United States Patent [19]
Miller

[11] 3,880,022
[45] Apr. 29, 1975

[54] WIRE CUTTING AND INSULATION STRIPPING APPARATUS

[75] Inventor: Harry E. Miller, Winston-Salem, N.C.

[73] Assignee: Western Electric Company, Incorporated, New York, N.Y.

[22] Filed: Mar. 27, 1973

[21] Appl. No.: 345,383

[52] U.S. Cl.............................................. 81/9.5 R
[51] Int. Cl............................................. H02g 1/12
[58] Field of Search............... 81/9.5 R, 9.5 A, 9.51

[56] References Cited
UNITED STATES PATENTS

| | | | |
|---|---|---|---|
| 3,103,837 | 9/1963 | Allen et al. | 81/9.5 R |
| 3,563,117 | 2/1971 | Bolssens | 81/9.5 A |
| 3,581,608 | 6/1971 | Baker | 81/9.5 R |
| 3,736,606 | 6/1973 | Raum et al. | 81/9.5 R |

*Primary Examiner*—Al Lawrence Smith
*Assistant Examiner*—Roscoe V. Parker
*Attorney, Agent, or Firm*—W. L. Williamson

[57] ABSTRACT

A wire cutting and insulation stripping apparatus is mounted on a hand-held, portable, wire-wrapping tool and includes a pair of wire cutting blades, a first and second pair of insulation cutting blades and a cylinder such as an air cylinder or solenoid for extending and retracting a rod. In a first embodiment, the wire cutting blades and the first insulation cutting blades are mounted on the cylinder and the second insulation cutting blades are mounted on the rod with the first and second insulation cutting blades directly adjacent each other when the rod is retracted. In operation, an insulated wire is inserted between the wire cutting blades and the first and second insulation cutting blades. This cuts the insulation. The wire cutting blades are then closed to cut the insulated wire and the rod is then extended to displace the second insulation cutting blades away from the first insulation cutting blades. This strips the cut insulation from the insulated wire. In the second embodiment, the first insulation cutting blades are mounted on the rod rather than the second insulation cutting blades and the first and second insulation cutting blades are directly adjacent to each other when the rod is extended. The operation of the second embodiment is essentially the same as the first except that the rod is retracted by the cylinder to strip the insulation from the insulated wire.

14 Claims, 2 Drawing Figures

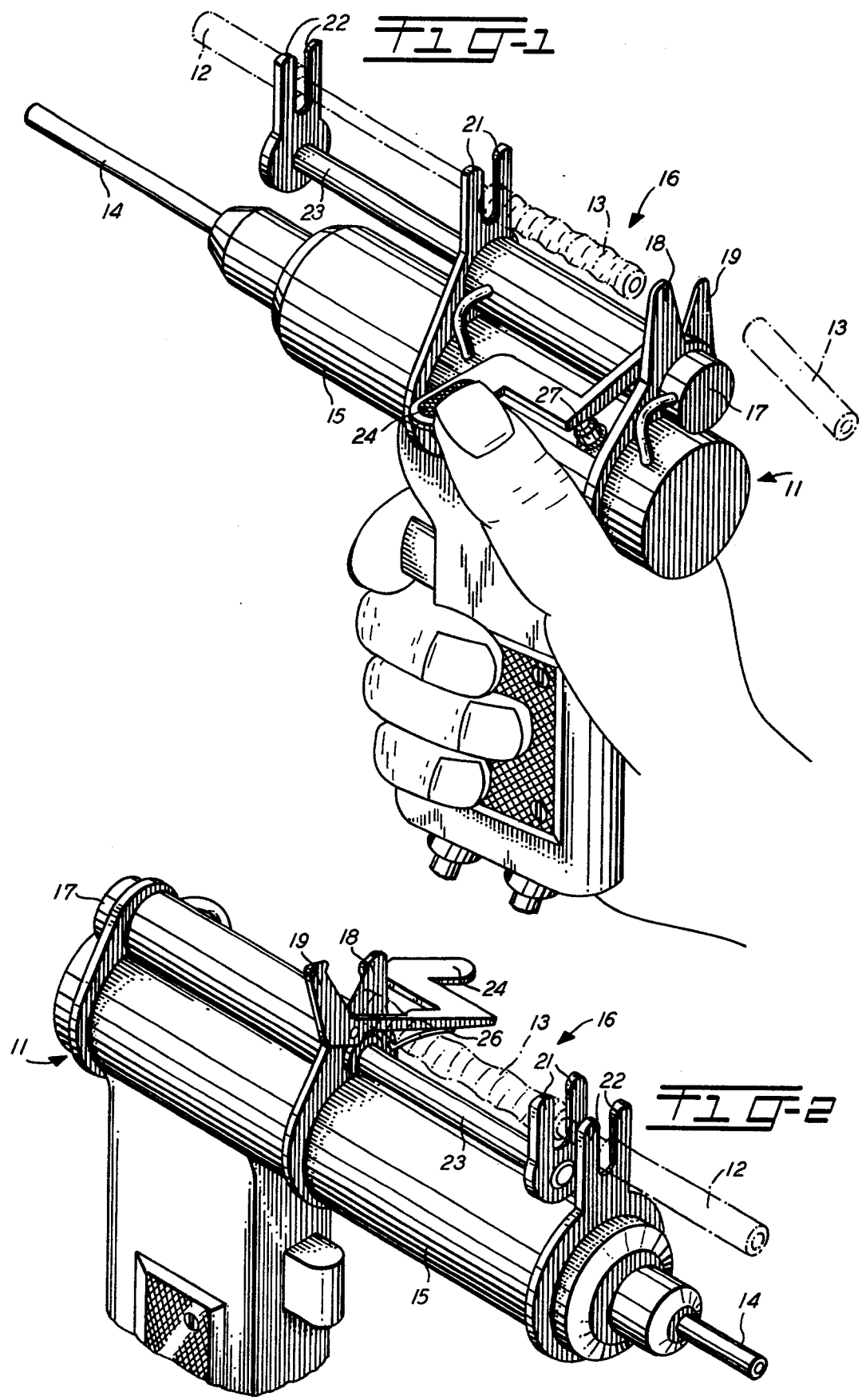

WIRE CUTTING AND INSULATION STRIPPING APPARATUS

BACKGROUND OF THE INVENTION

1. Field of the Invention

This invention relates to an apparatus for cutting an insulated wire and for stripping a predetermined length of insulation from the wire. More particularly, the invention relates to an apparatus for cutting an insulated wire and for stripping a predetermined length of insulation from the wire wherein the apparatus is mounted on a portable wire wrapping tool.

2. Description of the Prior Art

Electrical connections are commonly made by wrapping a wire tightly about a terminal to mechanically and electrically connect the wire to the terminal. Wire wrapping tools employ a rotary bit to grip one end of a wire and wrap the wire tightly about the terminal. This requires that a predetermined length of the wire be free of insulation, i.e., the length of wire wrapped about the terminal must be free of insulation if an electrical connection is to be made.

It is common in the prior art to strip the insulation from the end of a wire with a wire stripping tool just prior to wire wrapping. However, this requires that an operator lay down the wire wrapping tool, pick up the stripping tool, strip the wire, lay down the wire stripping tool and pick the wire wrapping tool back up for each wire wrap connection. This is not only tiring but is also time consuming and greatly reduces the efficiency of the operator and increases the cost of the wire wrap connection.

As a result, stripping tools are mounted directly on a wire wrapping tool so that the operator can strip and wrap with a single hand held tool. However, these stripping tools are manually operated and require the operator to grasp the wire in one hand and to pull the combination wire wrapping and stripping tool with the other hand to pull the insulation from the wire. This pulling motion is very tiring on the operator, and, the increased weight of the tool resulting from mounting the stripping tool on the wire wrap gun further increases operator fatigue. As a result, even though the necessity of handling multiple tools is eliminated, operator fatigue is not eliminated. Accordingly, operator efficiency is not increased and wire wrap cost remain high.

SUMMARY OF THE INVENTION

The invention contemplates an apparatus for cutting an insulated wire and for stripping a desired length of insulation from the wire wherein the apparatus is mounted on a portable wire wrapping tool and includes: (1) a first pair of insulation cutting blades mounted on the wire wrapping tool for cutting the insulation of an insulated wire inserted therebetween without cutting the wire, (2) a second pair of insulation cutting blades mounted on the wire wrapping tool directly adjacent to the first pair of blades for cutting the insulation of an insulated wire inserted therebetween without cutting the wire, (3) a pair of wire cutting blades mounted on the wire wrapping tool a predetermined distance from the first pair of insulation cutting blades, (4) facilities for pivoting the wire cutting blades with respect to each other to cut an insulated wire inserted therebetween and (5) facilities for displacing the first insulation cutting blades relative to the second insulation cutting blades to displace the first blades relative to the second blades thereby pulling the insulation from the wire.

DESCRIPTION OF THE DRAWINGS

FIG. 1 is an isometric view of one embodiment of the present invention illustrating a wire cutting and insulation stripping apparatus mounted on a wire wrapping tool; and FIG. 2 is an alternative embodiment of the invention also illustrating a wire cutting and insulation stripping apparatus mounted on a wire wrapping tool.

DETAILED DESCRIPTION

Referring now to FIG. 1, there is shown a conventional wire wrapping tool, viz., a wire wrap gun 11 which is portable and adapted to be hand held. As is well known in the art, an insulated wire 12 is wrapped on a terminal (not shown) by stripping a predetermined length of insulation 13 therefrom, inserting the stripped end of the wire into a wire wrap bit 14, positioning the bit over a terminal (not shown) and rotating the bit to wrap the wire tightly about the terminal (not shown). The bit 14 may be rotated either pneumatically or electrically as is well known in the art.

Mounted on housing 15 of the wire wrap gun 11 is a wire cutting and insulation cutting apparatus 16 which includes a cylinder 17, a pair of wire cutting blades 18 and 19, a first pair of insulation cutting blades 21—21 and a second pair of insulation cutting blades 22—22. The cylinder 17 has the pair of wire cutting blades 18 and 19 mounted at one end thereof and the pair of insulation cutting blades 21—21 mounted on the other end thereof. The second pair of insulation cutting blades 22—22 is mounted on rod 23 of the cylinder 17 and is positioned directly adjacent to the blades 21—21 when the rod is fully retracted. The cylinder 17 may also be operated either pneumatically or electrically, i.e., either an air cylinder or a solenoid may be used.

The wire cutting blades 18 and 19 are pivotally mounted with respect to each other and are spring biased by spring 26 (FIG. 2) to pivot away from each other into an open position for receiving the insulated wire therebetween. The blade 18 is rigidly mounted to the housing 16 and the blade 19 is pivotally mounted to the housing. Blade 19 is pivoted towards blade 18 by depressing handle 24 and is returned to its original position by the spring 26 (FIG. 2).

Each pair of insulation cutting blades, i.e., blades 21—21 and blades 22—22, is mounted with the blades in an opposed relationship so that, as an insulated wire is inserted between a pair of blades, the insulation is cut. The blades are spaced apart a distance greater than the diameter of the wire but less than the diameter of the insulation so that the insulation is cut but not the wire.

In operation, the rod 23 is fully retracted and an insulated wire 12 (FIG. 1) is inserted between the blades 18 and 19, 21—21 and 22—22. This cuts the insulation 13 a predetermined distance from the wire cutting blades 18 and 19. Handle 24 is then depressed to close the blades 18 and 19 and cut the insulated wire 12. By cutting the wire, the length of the wire between the wire cutting blades 18 and 19 and the blades 21—21 is fixed thereby insuring that a desired length of insulation will be stripped from the insulated wire. In other words, the length of insulation 13 stripped from the wire is equal to the distance between the wire cutting blades 18 and 19 and the insulation cutting blades 21—21. Further depression of handle 24 operates switch 27 to actuate cylinder 17 in any conventional manner and extend rod 23. As the rod is extended, the blades 22—22 are displaced away from the blades 21—21. As the blades 22—22 are spaced apart a distance less than the diameter of the insulation, the blades 22—22 push against the insulation 13 to displace the insulated wire 12 along with the blades 22—22. In a like manner, the blades 21—21 bear against severed insulation 13 thereby preventing the severed insulation from moving with the insulated wire. This relative motion between blades 21—21 and 22—22 strips the severed length of insulation 13 from the wire.

In FIG. 2, an alternative embodiment is illustrated wherein the wire cutting blades 18 and 19 are mounted at the front end of the cylinder 17, the insulation cutting blades 21—21 are mounted on the rod 23 and the insulation cutting blades 22—22 are mounted directly on the housing 15. In this embodiment, the blades 21—21 are directly adjacent the blades 22—22 when the rod 23 is fully extended.

In operation, the rod 23 is fully extended and an insulated wire 12 is inserted between the blades 18 and 19, 21—21 and 22—22. Handle 24 is depressed to close blades 18 and 19 and cut the insulated wire 12. Further depression of the handle operates switch 27 (FIG. 1) to actuate cylinder 17 in any conventional manner and retract rod 23. As the rod is retracted, the blades 21—21 are displaced away from the blades 22—22. As the blades 21—21 are spaced apart a distance less than the diameter of the insulation, the blades 21—21 push against the severed insulation 13 to displace the severed insulation along with the blades 21—21. Similarly, the blades 22—22 bear against the insulation of the insulated wire 12 thereby preventing the insulated wire from moving with the severed insulation. This relative motion between the blades 21—21 and 22—22 strips the severed length of insulation 13 from the wire.

In the embodiment of FIG. 2, the rod 23 does not move beyond the housing 15 during stripping. As will be appreciated, this is a safety feature which eliminates the possibility of the operator striking himself or others by inadvertent or unwise actuation of the cylinder 17.

In both of the embodiments, stripping occurs by actuation of the cylinder 17 and does not require an operator to pull the wire 12 and the apparatus 16 mounted on the wire wrap gun 11 relative to each other in order to strip insulation 13 from the wire 12. By eliminating this pulling action, operator fatigue is greatly reduced while permitting stripping and wire wrapping to be accomplished with a single hand held tool.

What is claimed is:

1. An apparatus for cutting an insulated wire and for stripping a desired length of cut insulation from the wire wherein the apparatus is mounted on a portable wire wrapping tool; said apparatus comprising:

a first pair of insulation cutting blades mounted on the wire wrapping tool, the first pair of insulation cutting blades being mounted in an opposed relationship so as to cut insulation when an insulated wire is inserted therebetween and the first pair of insulation cutting blades being spaced a sufficient distance from each other so that only the insulation is cut when the insulated wire is inserted therebetween;

a second pair of insulation cutting blades mounted on the wire wrapping tool directly adjacent to the first pair of insulation cutting blades, the second pair of insulation cutting blades being mounted in an opposed, spaced relationship like the first pair of insulation cutting blades;

means for cutting the insulated wire mounted on the wire wrapping tool a predetermined distance from the first pair of insulation cutting blades on the side opposite to the second pair of insulation cutting blades, the distance between the first pair of insulation cutting blades and the wire cutting means being equal to the desired length of insulation to be cut and stripped from the insulated wire;

means for opening the wire cutting means to receive an insulated wire therein and for closing the wire cutting means to cut an insulated wire positioned therein; and power assisted means for displacing said first and second pair of insulation cutting blades relative to each other to increase the distance therebetween, the first pair of insulation cutting blades bearing against the insulation between the first pair of insulation cutting blades and the wire cutting means and the second pair of insulation cutting blades bearing against the insulation of the insulated wire to displace the cut insulation relative to the insulated wire as the first and second pair of insulaton cutting blades are displaced away from each other thereby stripping the cut insulation from the insulated wire.

2. The apparatus of claim 1 wherein the first pair of insulation cutting blades are stationary and the power assisted means for displacing said first and second pair of insulation cutting blades relative to each other displaces the second pair of insulation cutting blades away from the first pair of insulation cutting blades.

3. The apparatus of claim 1 wherein the power assisted means for displacing said first and second pair of insulation cutting blades relative to each other is an air cylinder having a rod, the first pair of insulation cutting blades and the second pair of insulation cutting blades being mounted on said rod, extension of said rod displacing the second pair of insulation cutting blades away from the first pair of insulation cutting blades.

4. The apparatus of claim 1 wherein the power assisted means for displacing said first and second pair of insulation cutting blades relative to each other is a solenoid having a rod, the first pair of insulation cutting blades being mounted on said solenoid and the second pair of insulation cutting blades being mounted on said rod, extension of said rod displacing the second pair of insulation cutting blades away from the first pair of insulation cutting blades.

5. The apparatus of claim 1 wherein the second pair of insulation cutting blades are stationary and the power assisted means for displacing said first and second pair of insulation cutting blades relative to each other displaces the first pair of insulation cutting blades away from the second pair of insulation cutting blades.

6. The apparatus of claim 1 wherein the power assisted means for displacing said first and second pair of insulation cutting blades relative to each other is an air cylinder having a rod, the first pair of insulation cutting blades being mounted on said rod and said second pair of insulation cutting blades being mounted in a fixed position adjacent the first pair of insulation cutting blades when said rod is extended, retraction of said rod displacing the first pair of insulation cutting blades away from the second pair of insulation cutting blades.

7. The apparatus of claim 1 wherein the power assisted means for displacing said first and second pair of insulation cutting blades relative to each other is a solenoid having a rod, the first pair of insulation cutting blades being mounted on said rod and said second pair of insulation cutting blades being mounted in a fixed position adjacent the first pair of insulation cutting blades when said rod is extended, retraction of said rod displacing the first pair of insulation cutting blades away from the second pair of insulation cutting blades.

8. An apparatus for cutting an insulated wire and for stripping a desired length of cut insulation from the wire; said apparatus comprising:
- a first pair of insulation cutting blades mounted in an opposed relationship so as to cut insulation when an insulated wire is inserted therebetween, said first pair of insulation cutting blades being spaced a sufficient distance from each other so that only the insulation is cut when the insulated wire is inserted therebetween;
- a second pair of insulation cutting blades mounted directly adjacent to the first pair of insulation cutting blades, the second pair of insulation cutting blades being mounted in an opposed, spaced relationship like the first pair of insulation cutting blades;
- means for cutting the insulated wire mounted a predetermined distance from the first pair of insulation cutting blades on the side opposite to the second pair of insulation cutting blades, the distance between the first pair of insulation cutting blades and the wire cutting means being equal to the desired length of insulation to be cut and stripped from the insulated wire;
- means for opening the wire cutting means to receive an insulated wire therein and for closing the wire cutting means to cut an insulated wire positioned therein; and
- power assisted means for displacing said first and second pair of insulation cutting blades relative to each other to increase the distance therebetween, the first pair of insulation cutting blades bearing against the insulation between the first pair of insulation cutting blades and the wire cutting means and the second pair of insulation cutting blades bearing against the insulation of the insulated wire to displace the cut insulation relative to the insulated wire as the first and second pair of insulation cutting blades are displaced away from each other thereby stripping the cut insulation from the insulated wire.

9. The apparatus of claim 8 wherein the first pair of insulation cutting blades are stationary and the power assisted means for displacing said first and second pair of insulation cutting blades relative to each other displaces the second pair of insulation cutting blades away from the first pair of insulation cutting blades.

10. The apparatus of claim 8 wherein the power assisted means for displacing said first and second pair of insulation cutting blades relative to each other is an air cylinder having a rod, the first pair of insulation cutting blades being mounted on said cylinder and the second pair of insulation cutting blades being mounted on said rod, extension of said rod displacing the second pair of insulation cutting blades away from the first pair of insulation cutting blades.

11. The apparatus of claim 8 wherein the power assisted means for displacing said first and second pair of insulation cutting blades relative to each other is a solenoid having a rod, the first pair of insulation cutting blades being mounted on said solenoid and the second pair of insulation cutting blades being mounted on said rod, extension of said rod displacing the second pair of insulation cutting blades away from the first pair of insulation cutting blades.

12. The apparatus of claim 8 wherein the second pair of insulation cutting blades are stationary and the power assisted means for displacing said first and second pair of insulation cutting blades relative to each other displaces the first pair of insulation cutting blades away from the second pair of insulation cutting blades.

13. The apparatus of claim 8 wherein the power assisted means for displacing said first and second pair of insulation cutting blades relative to each other is an air cylinder having a rod, the first pair of insulation cutting blades being mounted on said rod and said second pair of insulation cutting blades being mounted in a fixed position adjacent the first pair of insulation cutting blades when said rod is extended, retraction of said rod displacing the first pair of insulation cutting blades away from the second pair of insulation cutting blades.

14. The apparatus of claim 8 wherein the power assisted means for displacing said first and second pair of insulation cutting blades relative to each other is a solenoid having a rod, the first pair of insulation cutting blades being mounted on said rod and said second pair of insulation cutting blades being mounted in a fixed position adjacent the first pair of insulation cutting blades when said rod is extended, retraction of said rod displacing the first pair of insulation cutting blades away from the second pair of insulation cutting blades.

* * * * *